(12) United States Patent
Wold (10) Patent No.: US 7,097,200 B2
(45) Date of Patent: Aug. 29, 2006

(54) INFLATABLE CURTAIN TRAJECTORY BRACKET

(75) Inventor: Dana Wold, Farmington Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 200 days.

(21) Appl. No.: 10/822,503

(22) Filed: Apr. 12, 2004

(65) Prior Publication Data

US 2005/0225060 A1   Oct. 13, 2005

(51) Int. Cl.
*B60R 21/16* (2006.01)
(52) U.S. Cl. .................................. 280/730.2
(58) Field of Classification Search ............. 280/730.2, 280/730.1, 728.2
See application file for complete search history.

(56) References Cited

U.S. PATENT DOCUMENTS

| 6,079,732 | A | | 6/2000 | Nakajima et al. | |
| 6,145,879 | A | * | 11/2000 | Lowe et al. | 280/743.1 |
| 6,149,185 | A | * | 11/2000 | White et al. | 280/728.2 |
| 6,152,482 | A | | 11/2000 | Patel et al. | |
| 6,257,616 | B1 | | 7/2001 | Nowak et al. | |
| 6,460,879 | B1 | | 10/2002 | Tanase et al. | |
| 6,793,241 | B1 | * | 9/2004 | Wallner et al. | 280/730.2 |
| 2002/0140211 | A1 | | 10/2002 | Takahara | |

FOREIGN PATENT DOCUMENTS

| EP | 0 791 511 | 8/1997 |
| EP | 0 836 970 | 4/1998 |
| EP | 0 904 992 | 3/1999 |

* cited by examiner

*Primary Examiner*—Faye M. Fleming
(74) *Attorney, Agent, or Firm*—Sally J Brown (57) ABSTRACT

The application provides a bracket for regulating the deployment characteristics of a deploying airbag cushion. The brackets of the invention provide at least local control over the deployment path of an airbag cushion by rotating at least a portion of the cushion along its length either away from a vehicle occupant, or more generally, away from a structure, person, or object possibly positioned in the path of a deploying airbag cushion. Such brackets may be structured to rotate a deploying cushion in part by providing an additional reaction surface and by partially surrounding the cushion.

37 Claims, 9 Drawing Sheets

INFLATABLE CURTAIN TRAJECTORY BRACKET

BACKGROUND OF THE INVENTION

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. Airbag systems were developed to supplement conventional safety belts by deploying into the space between an occupant and an interior object or surface in the vehicle during a collision event. The airbag acts to decelerate the occupant, thus reducing the chances of injury to the occupant caused by contact with the vehicle's interior.

Many typical airbag systems consist of several individual components joined to form an operational airbag module. Such components generally include an airbag cushion, an airbag inflator, a sensor, and an electronic control unit. Airbag cushions are typically made of a thin, durable fabric that is folded to fit into a compartment of a steering wheel, dashboard, interior compartment, roof, roof rail, roof compartment, or other space in a vehicle. The airbag inflator is in fluid communication with the airbag cushion, and is configured to produce a gas to inflate the cushion when it is needed. The sensors detect sudden decelerations of the vehicle that are characteristic of an impact or angular accelerations that are characteristic of a rollover event. The readings taken by the sensors are processed in the electronic control unit using an algorithm to determine whether a collision or rollover has occurred.

Upon detection of an impact of sufficient severity, the control unit sends an electrical signal to the inflator. The inflator uses one of many technologies currently known in the art to produce a volume of an inflation gas. The inflation gas is channeled into the airbag, inflating it. Inflation of the airbag causes it to deploy from its stored location, placing it in a position to receive the impact of a vehicle occupant. In primary impact airbag cushions, after contact of the occupant with the airbag and the corresponding deceleration of the occupant, the airbag rapidly deflates. To accomplish this, the inflation gas is vented from openings in the airbag, deflating it and freeing the occupant to exit the vehicle. In airbag cushions such as rollover curtains intended to protect a vehicle occupant during a rollover event, the airbag is not immediately vented. Instead, the airbag is maintained in a sealed condition for a period of time to maintain inflation and cushioning capacity. This period of time may, in some instances be at least six seconds in length.

As experience in the manufacture and use of airbags has increased, the engineering challenges involved in their design, construction, and use have become better understood. Most airbag systems are designed to rapidly inflate and provide a cushion in proximity to a vehicle occupant. Inflatable curtain airbag cushions are configured to be rapidly placed alongside a vehicle occupant between the occupant and the side doors, windows, and pillar structures of the vehicle.

The placement of inflatable curtain airbag cushions is determined based on carefully-researched and tested presumptions made of the position occupied by a vehicle occupant in a vehicle during normal operation of the vehicle. Curtains are configured to deploy into a space not predicted to be occupied and to fill much of that space, preventing interaction of the occupant and the side of the vehicle. As a result, a vehicle occupant generally enjoys optimal protection from a specific airbag when the occupant is in the presumed range of positions when the airbag deploys.

In some situations, injuries have been noted to occur when a vehicle occupant is "out-of-position" with regard to the presumed position discussed above. Some such injuries have been attributed to incidents in which vehicle occupants located out-of-position during the deployment of an airbag cushion are located in the path of the inflating cushion. Currently available airbag systems have little ability to regulate the trajectory of an inflatable curtain airbag cushion during deployment. As a result, injuries may occur along the inflation path of the inflatable curtain before it has reached its final position and full inflation.

Another issue presented by many specific airbag applications is the need to assure consistent placement of the airbag cushion after deployment. Inflatable curtain airbag cushions face some deployment difficulties as a result of their location in the roof. Improper or incomplete deployment may be caused by curtain becoming tangled in the roof trim or other interior features of the vehicle. Deployment problems may cause poor placement of the inflated curtain, providing less-than-optimal protection to the vehicle occupant. Attempts have been made in currently-used inflatable curtain airbag systems to minimize such problems, but they persist. As a result, it would be beneficial to provide an inflatable curtain airbag system in which the trajectory of the deploying airbag curtain may be modified along its length to enhance the ability of the curtain to predictably exit roof trim, avoid obstacles in potential deployment paths of the curtain, and to deploy away from the predicted position of a vehicle occupant.

Accordingly, a need exists for systems for use with inflatable curtain airbag cushions that provide deployment trajectory control for at least a localized portion of the airbag cushion. It would be specifically beneficial to provide an inflatable curtain trajectory bracket capable of providing predictable deployment of an inflatable curtain locally inboard to properly exit roof trim and locally outboard in regions near a vehicle occupant's predicted position. Such inflatable curtain airbag cushion trajectory regulation devices and methods for their use are provided herein.

BRIEF SUMMARY OF THE INVENTION

The apparatus and method of the present invention have been developed in response to the present state of the art, and in particular, in response to the problems and needs in the art that have not yet been fully solved by currently available systems and methods for modifying the deployment trajectory of an inflatable curtain airbag cushion. Thus, the present invention provides novel inflatable curtain trajectory brackets for regulating the deployment path of an inflatable curtain airbag cushion along either a portion of its length or along its entire length.

In one embodiment, the invention provides a bracket for controlling the inflation trajectory of at least a portion of an inflatable curtain airbag cushion. The bracket generally includes a bracket mounting panel configured to abut a roof rail of a vehicle and a curtain reaction panel extending from the bracket mounting panel in an inboard direction. The curtain reaction panel may generally extend from the bracket mounting panel in an inboard direction downwardly at an angle relative to the mounting panel. The reaction panel then terminates in an inboard edge. This curtain reaction panel is sized to correspond to the length of at least a portion of the inflatable curtain for which trajectory control is desirable. The curtain reaction panel of the bracket serves as a reaction panel for the inflating airbag cushion, and includes at least one curtain pivot to assist in rotating the trajectory of the inflating curtain. The bracket rotates an inflatable curtain deploying from the bracket to control its downward trajectory into the cabin of the vehicle in which it is installed.

In some alternate embodiments of the trajectory brackets of the invention, the bracket may further include an inboard reaction panel extending more sharply downwardly in a transverse direction and slightly outwardly in a lateral direction. In these embodiments of the trajectory control brackets of the invention, the cushion pivots may be positioned on the inboard reaction panel instead of the curtain reaction panel to provide additional rotation of the corresponding portion of the inflatable curtain airbag cushion during deployment of the cushion.

The brackets of the invention are configured to direct the deployment trajectory of an inflatable curtain airbag cushion by varying the position of the curtain pivot. Generally, the further inboard the curtain pivot is placed on the top or inboard reaction panels of the brackets of the invention relative to the bracket mounting panel of the brackets, the more outboard rotation will be imparted to the corresponding portion of the curtain. Conversely, the closer the curtain pivot is placed to the bracket mounting panel, the less direction of the curtain in an outboard direction. According to the invention, the curtain pivot may be a slot for receiving a portion of the inflatable curtain. Such a slot is configured to receive a tab extending from the airbag curtain upward and to allow the tab to pass through the bracket to allow it to be attached to the vehicle. Alternately, the curtain pivot may be an inboard edge of the curtain reaction panel.

In some embodiments of the inflatable curtain trajectory bracket of the invention, the mounting panel includes features to aid attachment of the bracket to a vehicle. In some instances, such features may include at least one mounting tab extending from the bracket to a position of the roof rail of the vehicle suitable for attachment of the bracket. The trajectory brackets of the invention may further be sized to correspond to a feature in the vehicle, as briefly discussed above, near which inboard or outboard rotation is desirable. In specific embodiments of the brackets of the invention, the brackets may be sized to correspond to the size of an occupant region of the vehicle such as an area adjoining or over a seat of a vehicle or other position where a vehicle occupant could potentially be present, a trim panel of the vehicle, or a vehicular pillar.

The specific configuration of portions of the bracket may be varied within the scope of the invention. In some brackets of the invention, the curtain reaction panel extends from the bracket mounting panel at a substantially perpendicular angle. Similarly, the inboard reaction panel may extend from the curtain reaction panel of the bracket at an angle substantially perpendicular to the curtain reaction panel such that when mounted in a vehicle, the inboard reaction panel is angled downwardly and outwardly.

The inflatable curtain trajectory brackets of the invention may be incorporated into inflatable curtain airbag modules. Such inflatable curtain airbag modules may include an inflatable curtain airbag cushion, an airbag inflator, and a curtain trajectory bracket for controlling the inflation trajectory of at least a portion of the inflatable curtain as described briefly above. More specifically, the trajectory bracket may include a bracket mounting panel, a curtain reaction panel, and a curtain pivot, and is sized to correspond to the length of at least a portion of the inflatable curtain such as the size of a feature selected from the group consisting of a vehicle pillar, an occupant region, and a trim panel. The bracket may additionally include an inboard reaction panel. The curtain pivot of the bracket is positioned on either the inboard reaction panel or the curtain reaction panel of the bracket in the form of a slot or edge for receiving tabs extending through the bracket from the inflatable curtain airbag cushion.

Inflatable curtain airbag modules according to the invention may include inflatable curtain airbag cushions folded according to a wide variety of patterns. In some embodiments, the inflatable curtain airbag cushion may be roll-folded. In others, the inflatable curtain airbag cushion may be pleat-folded. Further, the pleat-folded inflatable curtain airbag cushion may be placed in the module oriented at an angle to a desired direction of curtain deployment.

These and other features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the inflatable curtain trajectory brackets of the present invention, as represented in FIGS. 1 through 13, is not intended to limit the scope of the invention, as claimed, but is merely representative of presently preferred embodiments of the invention.

As briefly discussed above, the invention provides a bracket for controlling the trajectory of an inflatable curtain airbag cushion. Such brackets provide the ability to direct the inflation trajectory of at least a portion of an airbag cushion in either an inboard or outboard fashion to help assure proper deployment of the curtain away from vehicle occupants and around obstacles such as trim panels.

Figure 1:
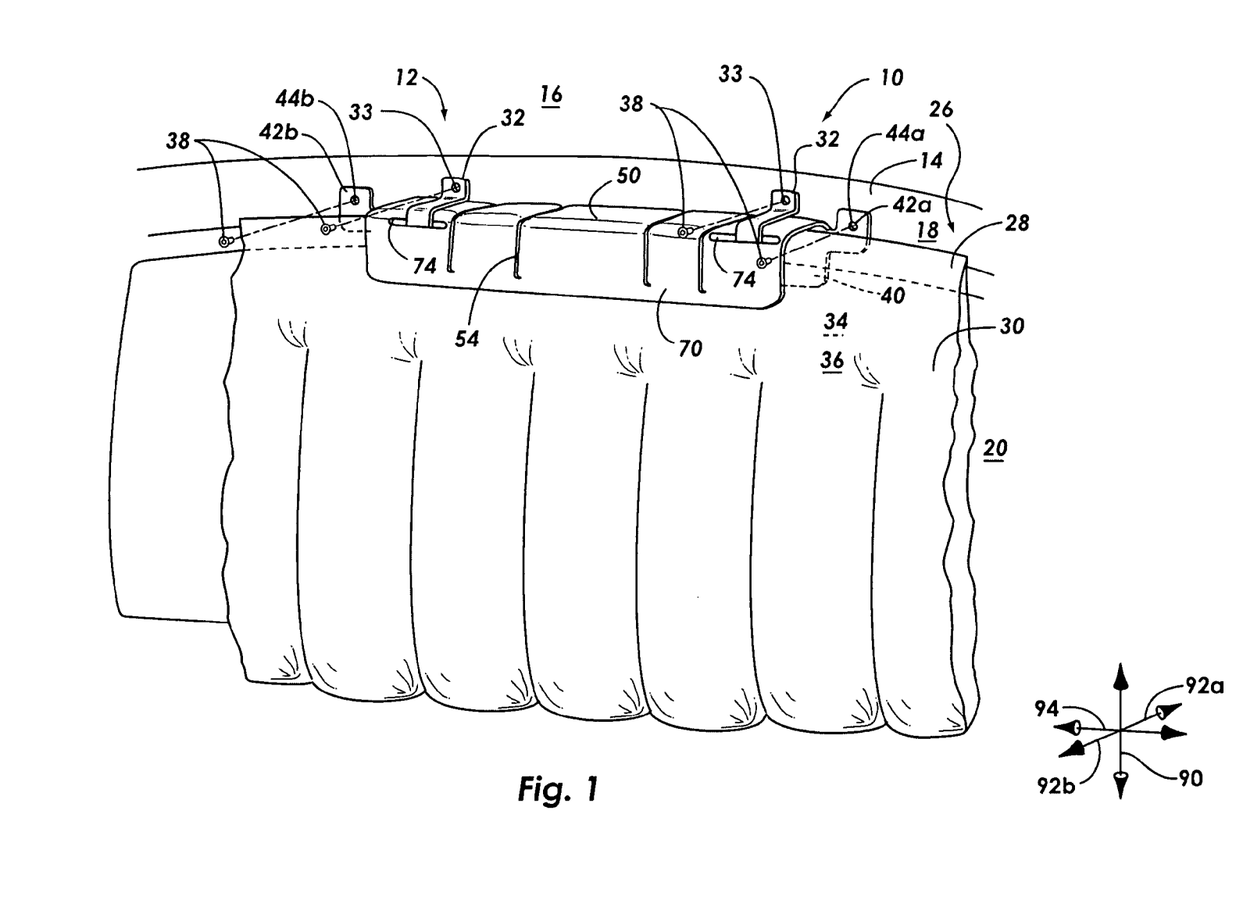
FIG. 1 is a perspective view of a portion of the interior of a vehicle illustrating an inflatable curtain trajectory bracket according to the invention shown installed in a vehicle in use with a deployed inflatable curtain airbag cushion.

Referring first to FIG. 1, a perspective view of a portion of the interior of a vehicle 12 is provided. In this view, an inflatable curtain trajectory bracket 10 according to the invention is shown. The bracket 10 is shown installed in the vehicle 12 about a portion of an inflatable curtain airbag cushion 26 shown deployed. The bracket 10 is mounted to the roof rail 14 portion of the roof 16 of the vehicle 12 in a region above a side window 20 of the vehicle.

The bracket 10 is shown to include a bracket mounting panel 40 (shown in phantom), a curtain reaction panel 50, and an inboard reaction panel 70. These structures partially encompass a fill channel portion 28 of the cushion 26. The curtain body portion 30 of the cushion 26 extends downwardly from the fill channel portion 28 of the cushion in a transverse direction. Curtain mounting tabs 32 are shown to extend upward in a transverse direction through curtain pivots 74 of the bracket 10 and then toward the roof rail 14. The tabs 32 may then be attached to the vehicle 12 by fasteners 38, which may take the form of bolts, screws, or any of a wide variety of fasteners known in the art. As illustrated in FIG. 1, the curtain tabs 32 are attached to the roof rail 14 with their own fasteners 38. The curtain tabs 32 may alternatively be configured to be attached to the roof rail 14 of the vehicle 12 using fasteners 38 that also attach the bracket mounting tabs 42 to the roof rail 14 of the vehicle.

Figure 2:
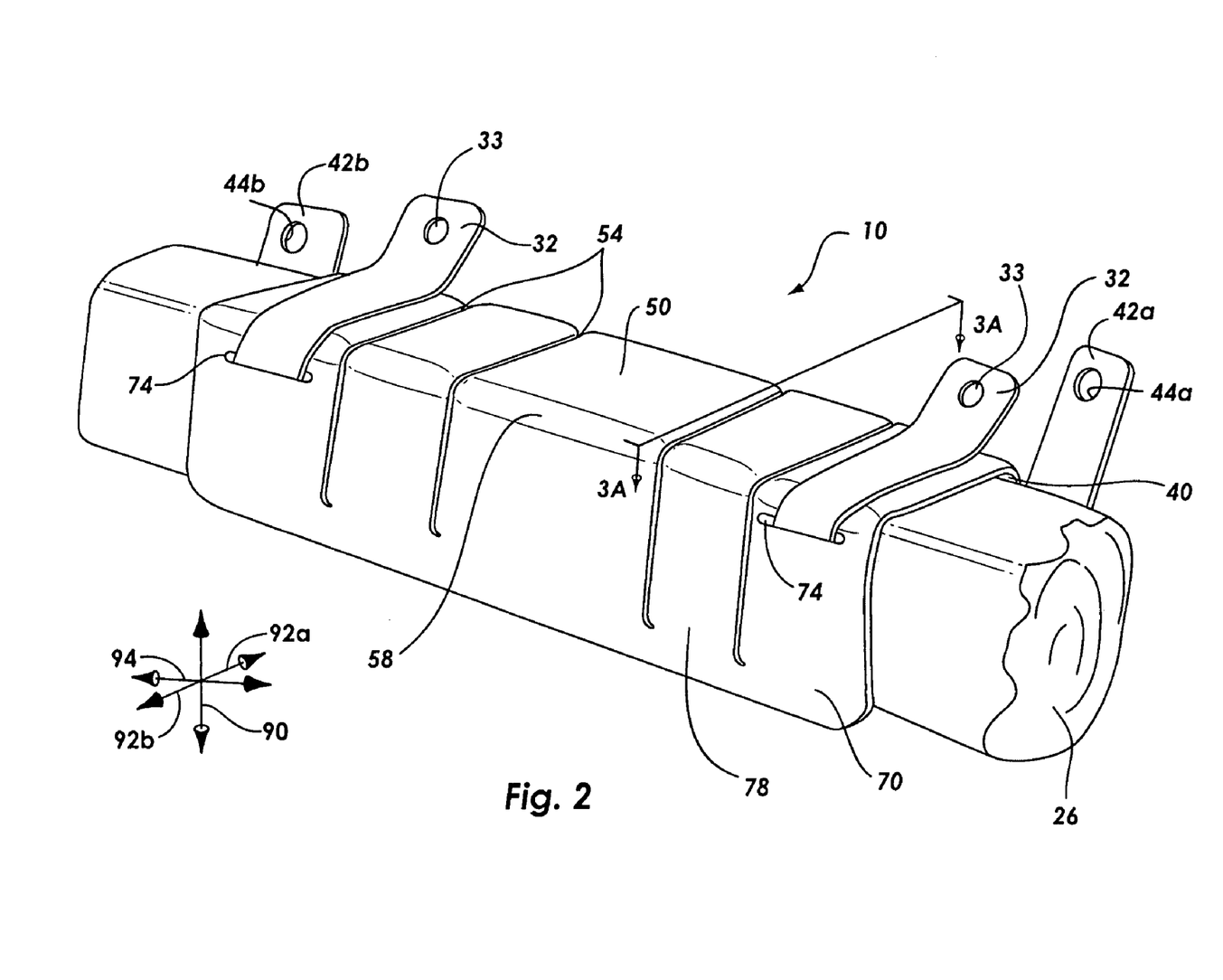
FIG. 2 is an isolated perspective view of the inflatable curtain trajectory bracket of FIG. 1 showing the bracket isolated from the vehicle with the inflatable curtain in its stowed configuration.

The inflatable curtain trajectory bracket 10 of FIG. 1 is also illustrated in FIG. 2. In FIG. 2, the bracket 10 is shown in an isolated perspective view with the bracket shown isolated from the vehicle 12 of FIG. 1. In FIG. 2, the inflatable curtain 26 is illustrated in its stowed configuration. As discussed above, the bracket 10 includes a bracket mounting panel 40, a curtain reaction panel 50, and an inboard reaction panel 70. The bracket 10 illustrated in FIG. 2 is a single unitary structure formed by stamping, folding, molding, and/or cutting a rigid material such as a metal or plastic. In alternative embodiments, the brackets 10 of the invention may instead be constructed of multiple components suitably joined together. In the embodiment of the brackets 10 of the invention illustrated in FIG. 1, ribs 54 are shown present on surfaces of structures such as the outboard, top, and inboard reaction panels 40, 50, and 70. Such ribs 54 may be produced to strengthen the structure of the brackets 10 and may be varied in size, number, and position as is known to one of ordinary skill in the art. In alternative embodiments, the ribs 54 may be excluded.

The bracket mounting panel 40 of the bracket 10 is a substantially flattened structure adapted to be placed against a roof rail of a vehicle and to facilitate attachment of the bracket 10 to a vehicle for use. Accordingly, the bracket mounting panel 40 may include mounting tabs 42a, 42b configured to assist in attaching the bracket 10 to a vehicle. The shape, size, number, and orientation of the mounting tabs 42a, 42b may be varied to accommodate varying vehicle geometries. More specifically, as illustrated, mounting tab 42a is elongated and extends further upward in a transverse direction 90 than mounting tab 42b. Such an asymmetrical configuration may be useful in installation of the bracket 10 into vehicles to assure that the brackets 10 are properly oriented in the vehicle.

In addition, the variability of the shape, size, number, and orientation of the mounting tabs 42a, 42b allows the trajectory bracket 10 to be customized to fit a wide variety of vehicle geometries. More specifically, although the bracket 10 of FIGS. 1 and 2 is illustrated having two asymmetrical mounting tabs 42a, 42b, any number of tabs, symmetrical or asymmetrical in size and/or shape may be used within the scope of the invention. In one example in which the trajectory bracket 10 is mounted high on the roof rails of a vehicle, mounting tabs may be omitted altogether, with fasteners placed through the bracket mounting panel 40 itself. In another example in which it is desirable to control the trajectory of an elongated portion of an inflatable airbag curtain, mounting tabs may be placed along the length of the bracket 10 as well as at its ends. In addition, although FIG. 1 portrays the bracket 10 as being attached to the vehicle 12 using bolts, screws, or other similar fasteners 38 which pass through bores 44a, 44b, other attachment methods such as snap-in attachment or welding may be used when the bracket 10 is appropriately configured, as known to one of ordinary skill in the art. Such alternate attachment methods may allow the omission of bores 44a, 44b.

The bracket 10 of FIG. 2 further includes a curtain reaction panel 50. The curtain reaction panel 50 is shown to include a plurality of ribs 54 extending from the bracket mounting panel 40 and continuing onto the inboard reaction panel 70. As discussed above, the ribs 54 may be used in brackets of the invention to add rigidity and thus prevent deformation of the bracket 10 during deployment of the airbag cushion 26. The number, placement, and size of the ribs 54 may be varied within the scope of the invention to provide sufficient rigidity for a specific application. The ribs 54 may alternately be excluded altogether. The curtain reaction panel 50 is shown to transition into an inboard reaction panel 70 through a bend 58. In FIG. 2, this bend 58 is illustrated to orient the inboard reaction panel 70 in a manner substantially perpendicular to the curtain reaction panel 50. Variations in the angle of the bend 58 are encompassed within the scope of the invention, however, such that the inboard reaction panel 70 may be positioned at an angle greater-than or less-than 90°. The placement of this panel 70 may be adjusted to regulate the deployment angle of the inflatable curtain airbag cushion 26.

The bracket of FIGS. 1 and 2 also features an inboard reaction panel 70 extending from the curtain reaction panel 50. As illustrated, the inboard reaction panel 70 is illustrated to include ribs 54 extending from the curtain reaction panel 50, and curtain pivots 74 for receiving curtain tabs 32 from the inflatable curtain airbag cushion 26. Further, as noted above, the ribs 54 may be omitted. As discussed briefly above and in more detail below, the curtain pivots 74 may be placed in a variety of positions on the top and inboard reaction panels 50, 70. In some embodiments of the bracket 10 of the invention, no inboard reaction panel 70 may be present, thus necessitating placement of the pivot or pivots 74 on the curtain reaction panel 50 or along an edge of the curtain reaction panel 50 (not shown). In addition to this, the curtain pivots 74 may be positioned in a plurality of locations up and down the inboard reaction panel 70 in a transverse direction 90.

In some embodiments of the inflatable curtain trajectory bracket 10 of the invention, the inboard reaction panel 70 may be substantially flattened, while in others, (as illustrated), the inboard reaction panel 70 may include an additional bend 78. This bend 78 allows a bottom edge of the inboard reaction panel 70 to provide additional direction to the inflatable curtain airbag cushion 26 during deployment. The degree of the bend 78 may be varied within the scope of the invention, as may the size of the portion of the inboard face 70 positioned below the bend 78 in a transverse direction 90.

Figure 3A:
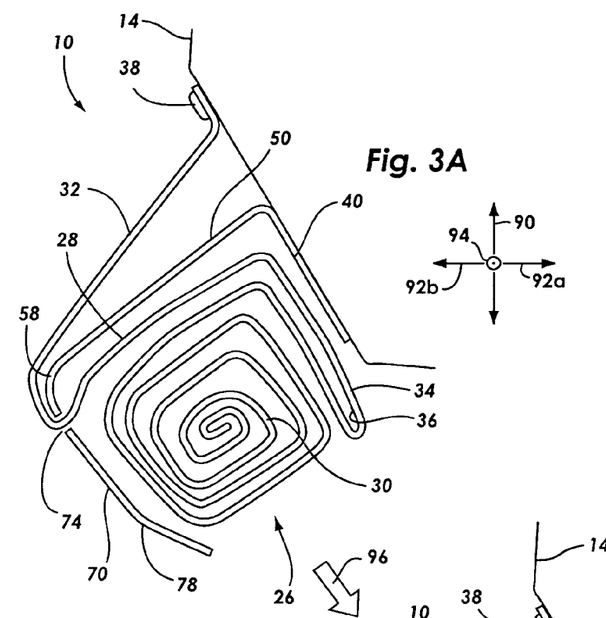
FIG. 3A is a cross-sectional view of the inflatable curtain trajectory bracket of FIGS. 1 and 2 taken at line 3A—3A of FIG. 2.

Referring next to FIG. 3A, a cross-sectional view of the inflatable curtain trajectory bracket 10 of FIGS. 1 and 2 is shown taken at line 3A—3A of FIG. 2. As above, the bracket 10 includes a bracket mounting panel 40, a curtain reaction panel 50, and an inboard reaction panel 70. The bracket 10 is shown mounted to a roof rail 14 using mounting tabs 42a, 42b (not shown). The bracket 10 partially encloses an inflatable curtain airbag cushion 26 shown here in its stowed configuration. In this example, the cushion 26 is shown roll-folded and placed into the bracket 10 with a curtain tab 32 extending through a curtain pivot 74 positioned on the inboard reaction panel 70 of the bracket 10. The curtain tab 32 is then attached to the roof rail 14 by a fastener 38.

In FIG. 3A, the inflatable curtain airbag cushion 26 is illustrated in its stowed configuration. The cushion 26 is stowed by roll-folding the cushion body 30 of the curtain 26 and pleat-and-wrap-folding the fill channel 28 of the curtain 26 about the roll-folded body 30. Following these steps, the bracket 10 is placed about a portion of the curtain 26 that is desired to be controlled during deployment. When the curtain 26 begins to deploy, the fill channel 28 is inflated first, expanding to push the roll-folded cushion body 30 out of the bracket 10. As the fill channel 28 expands, it contacts the interior surfaces of the top and inboard reaction panels 50, 70, which serve as reaction surfaces by supplying a reaction force to the cushion 26, directing it in an outboard orientation in a lateral direction 92a and downward in a transverse direction 90. The resulting configuration is illustrated in FIG. 3B, in which a portion of the cushion 26 is shown fully inflated and expanding in a direction indicated by arrow 96.

Figure 3B:
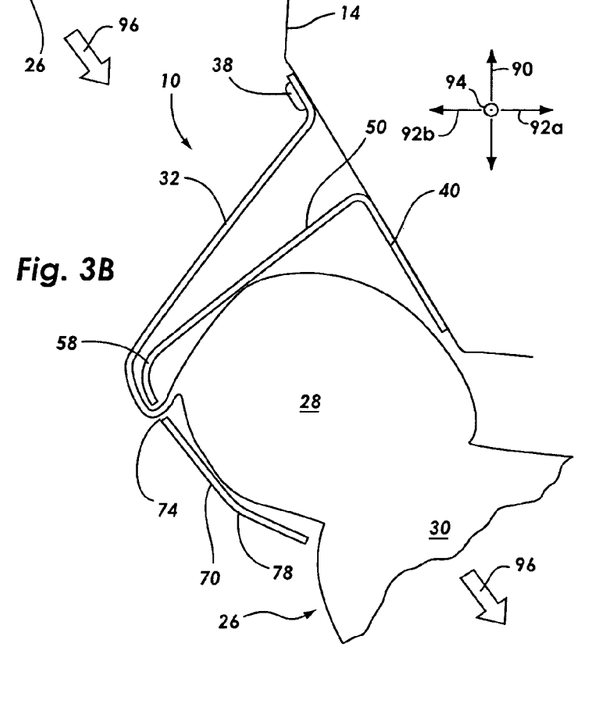
FIG. 3B is a view of the inflatable curtain trajectory bracket of FIG. 3A showing the curtain deployed in an outboard direction as a result of the use of the bracket of the invention.

More specifically, FIG. 3B shows the inflatable curtain trajectory bracket 10 of FIG. 3A showing the curtain 26 deployed in an outboard and downward direction indicated by arrow 96 as a result of the use of the bracket of the invention. As noted above, this deployment direction results from the interaction of the cushion 26 with the inboard reaction panel 70 and the curtain reaction panel 50. The inflatable curtain 26 interacts with these particular panels 50, 70 of the bracket 10 as a result of the placement of the curtain pivot 74 on the inboard reaction panel 70. This aligns the curtain 26 such that as the fill channel 28 begins to expand during deployment, the inboard and outboard faces 36, 34 of the curtain 26 impact the inboard and curtain reaction panels 70, 50, respectively, of the bracket 10, directing the curtain 26 downwardly in a transverse direction 90 and also in an outboard lateral direction 92a. Thus, as the fill channel 28 of the curtain 26 expands, it propels the curtain body 30 in the direction 96. As illustrated in FIG. 3A, the curtain body 30 is roll-folded toward the outboard face 34 of the curtain 26, and as a result, the curtain body 30 will unroll toward the side windows or other lateral internal surfaces of the vehicle.

Figures 4, 5:
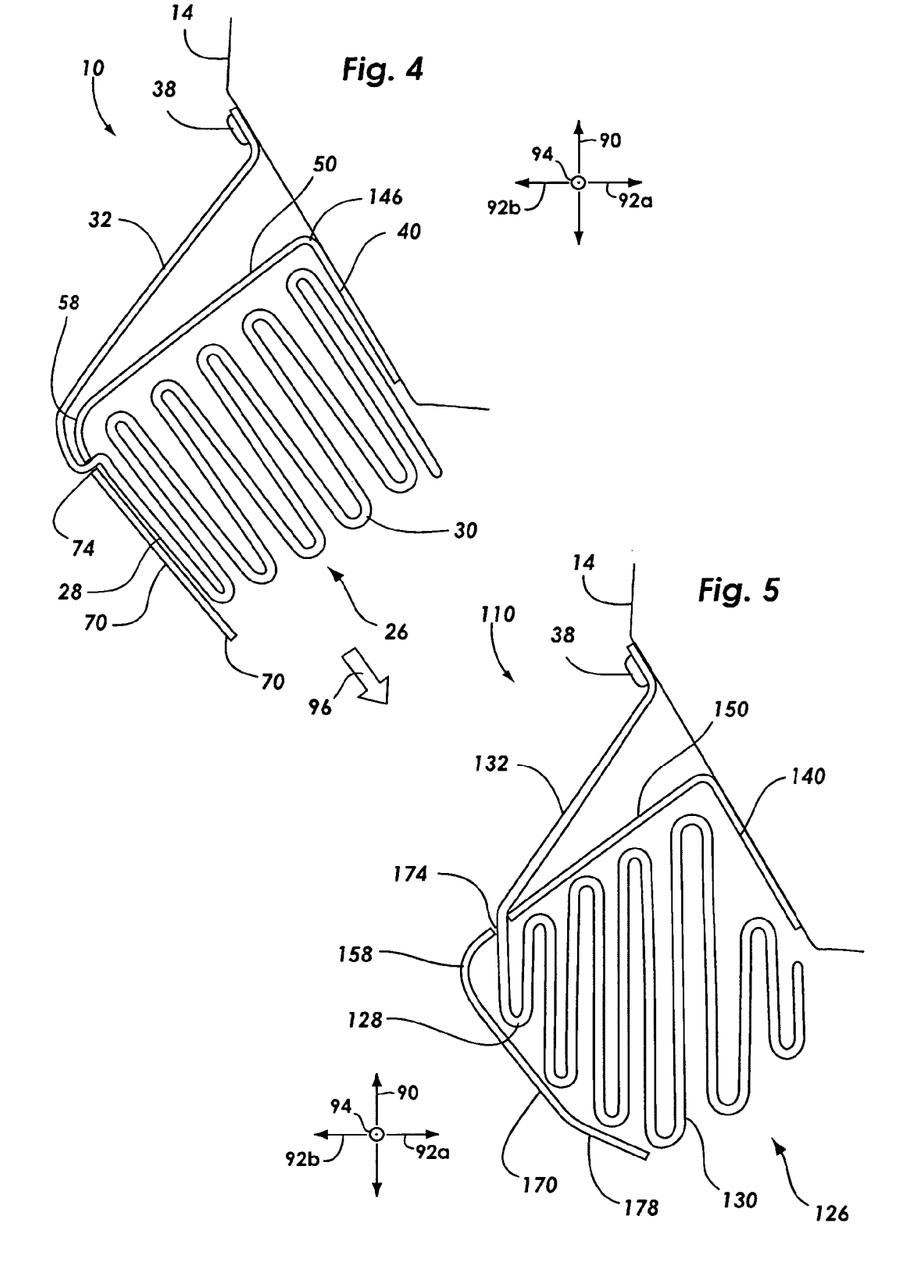
FIG. 4 is a cross-sectional view of an alternate embodiment of an inflatable curtain trajectory bracket according to the invention taken in a position analogous to that of FIG. 3A.
FIG. 5 is a cross-sectional view of another alternate embodiment of an inflatable curtain trajectory bracket according to the invention taken in a position similar to that of FIGS. 3A and 4.

FIG. 4 portrays the inflatable curtain trajectory bracket 10 of FIGS. 1–3B in a cross-sectional view analogous to that of FIG. 3A. In FIG. 4, however, the bracket 10 is installed about an inflatable curtain airbag cushion 26 that is completely pleat-folded. Use of such a folding pattern with the curtain 26 may enhance the ability of the bracket 10 to direct the deployment trajectory of the curtain 26 by allowing the curtain 26 to be at least locally rotated when stored. As above, with this curtain 26, as the fill channel 28 expands, it will displace the curtain body 30 from the bracket 10. The fill channel 28 will also contact the inboard reaction panel 70 and the curtain reaction panel 50 and as a result, be directed generally in the direction 96. The pleat-folded curtain body 30 will not unroll, but expand rapidly in the direction 96 by simply expanding the pleats of the curtain 26.

Referring next to FIG. 5, a cross-sectional view of an alternate embodiment of the inflatable curtain trajectory bracket 110 of the invention is shown taken in a position similar to that of FIGS. 3A and 4. This embodiment of the bracket 110 of the invention includes a bracket mounting panel 140, a curtain reaction panel 150, and an inboard reaction panel 170. As above, the bracket mounting panel 140 is positioned adjacent the roof rail 14 of a vehicle (not shown) when the bracket 110 is mounted in the vehicle. The curtain reaction panel 150 extends from the bracket mounting panel 140 at an angle through a bend 146. The bend 146 may place the outboard and curtain reaction panels 140, 150 substantially perpendicular to each other. Similarly, the inboard reaction panel 170 is linked to the curtain reaction panel 150 by a bend 158. This bend 158 may also place the top and inboard reaction panels 150, 170 substantially perpendicular to each other.

The bracket 110 of FIG. 5 differs from that originally disclosed in FIGS. 1–4. One such difference is the placement of the curtain pivot 174. More specifically, while the curtain pivot 74 of the bracket 10 of FIGS. 1–4 is located on the inboard reaction panel 70 of the bracket, the curtain pivot 174 of the bracket 110 of FIG. 5 is located on the curtain reaction panel 150 of the bracket 110. As discussed briefly above, the placement of the curtain pivot 174 affects the amount of rotation imparted to the airbag cushion 126 by the bracket 110. More specifically, using the brackets of the invention, it is generally the case that the further a pivot 174 is placed along the surface of the bracket 110 away from the bracket mounting panel 140, the more outboard rotation is imparted to the portion of the airbag cushion 126 encompassed by the bracket 110. In FIG. 5, as a result of the placement of the pivot 174 on the curtain reaction panel 150 of the bracket 110 closer to the bracket mounting panel 140, the airbag cushion 126 is rotated to a lesser degree than the cushion illustrated in FIGS. 1–4.

A next difference noticeable in the bracket 110 of FIG. 5 is the orientation of the cushion 126 within the bracket 110. More specifically, although the cushion 126 is pleat-folded as it is in the previously-discussed Figures, it is rotated within the bracket 10. This rotation places the cushion 126 in a position such that the body 30 of the cushion 126 does not need to rotate as much from its original angle of placement during deployment.

Figure 6:
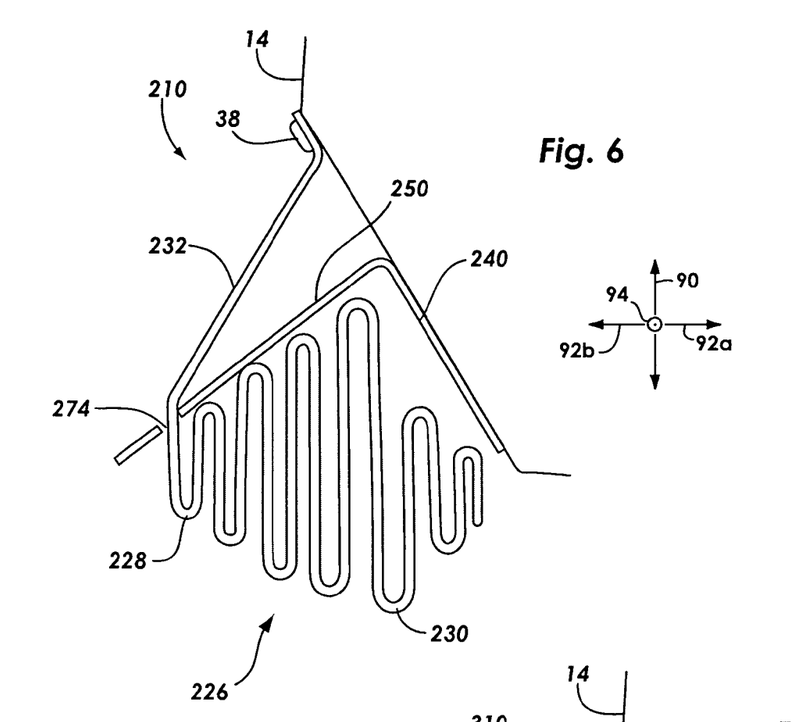
FIG. 6 is a cross-sectional view of yet another alternate embodiment of an inflatable curtain trajectory bracket according to the invention taken in a position similar to that of FIGS. 3A–5.

Referring next to FIG. 6, a cross-sectional view of yet another embodiment of the inflatable curtain trajectory bracket 210 of the invention is shown taken in a position similar to that of FIGS. 3A–5. The bracket 210 differs from those discussed above in that it includes only a bracket mounting panel 240 and a curtain reaction panel 250, thus omitting an inboard reaction panel such as 70 of FIGS. 1–3B. In bracket 210, the curtain reaction panel 250 and the bracket mounting panel 240 together act as primary initial reaction surfaces for the deploying cushion 226.

The bracket 210 also provides a curtain pivot 274 in the form of a slot positioned on the curtain reaction panel 250. The amount of outboard curtain rotation provided by the bracket 210 will depend in part on the positioning of the pivot 274 along the curtain reaction panel 250. More specifically, the nearer the pivot 274 is placed to the outboard bracket 240, the less outboard roll is imparted to the cushion 226.

Figure 7:
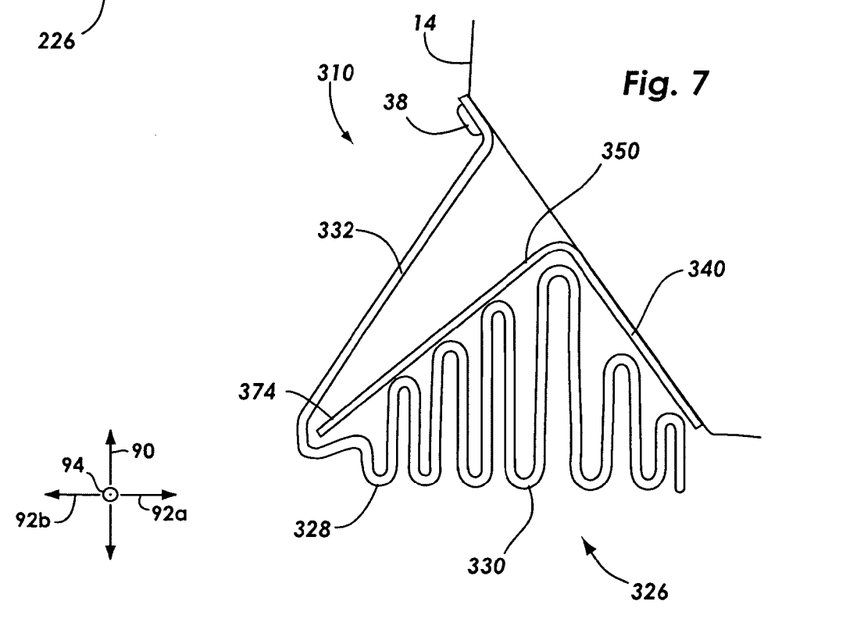
FIG. 7 is a cross-sectional view of still another alternate embodiment of an inflatable curtain trajectory bracket according to the invention taken in a position similar to that of FIGS. 3A–6.

FIG. 7 illustrates a cross-sectional view of still another alternate embodiment of the inflatable curtain trajectory bracket 310 of the invention taken in a position similar to that of FIGS. 3A–6. This bracket 310 is structurally similar to that shown in FIG. 6 with the exception that the bracket 310 provides a curtain pivot 374 in the form of the terminal end 384 of the curtain reaction panel 350. In such a bracket 310, the amount of outboard rotation imparted to the cushion 326 is regulated by the length of the curtain reaction panel 350, and thus the position of the terminal end 384 of the curtain reaction panel 350.

Figure 8:
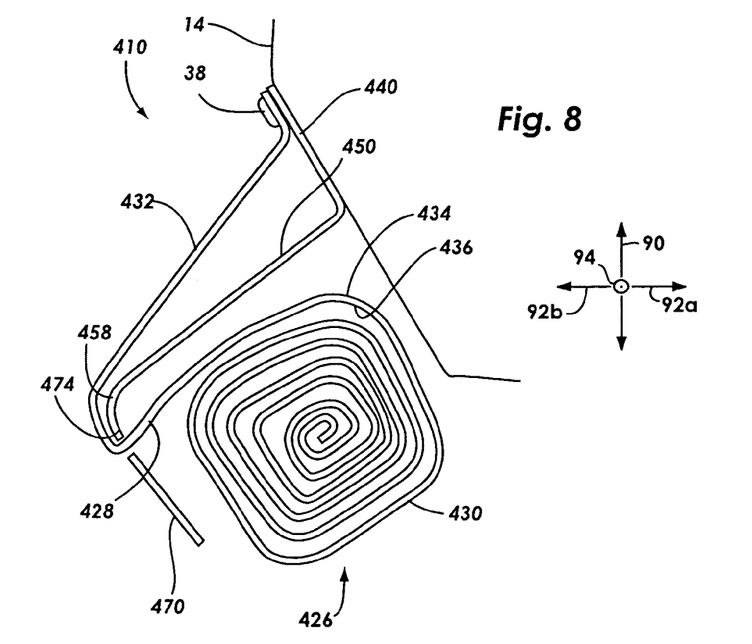
FIG. 8 is a cross-sectional view of an inflatable curtain trajectory bracket according to the invention taken in a position similar to that of FIGS. 3A–7.

Referring next to FIG. 8, a cross-sectional view of another inflatable curtain trajectory bracket 410 is shown taken at in a position analogous to line 3A—3A of FIG. 2. In FIG. 8, the bracket 410 includes a bracket mounting panel 440, a curtain reaction panel 450, and an inboard reaction panel 470. Unlike the brackets featured in earlier Figures and discussion, the bracket mounting panel 440 of the bracket 410 is angled upwardly such that it may be attached to roof rail 14 at a point above the airbag cushion 426 associated with the bracket 410. Such a configuration may be useful to accommodate the bracket 410 into the specific mounting structures and space available in a particular vehicle.

As in previous brackets discussed above, the inflatable curtain airbag cushion 426 is accommodated within the bracket 410. In bracket 410, the cushion 426 is accommodated within a space defined by the top or reaction panel 450 and the inboard panel 470. Mounting tabs 432 extend from the cushion 426 through curtain pivots 474, travel about the bend 458, and are mounted to the roof rail 14 of a vehicle by a fastener 38. In the use of the bracket 410, these tabs 432 may be mounted to the bracket mounting panel 440 instead of directly to the roof rails 14 of the vehicle as shown above. Indeed, in some circumstances, the tabs 432 may be mounted to the mounting panel 440 with the same fasteners 38 used to mount the bracket 410 to the vehicle. This could simplify the inflatable curtain installation process are reduce the number of parts needed to install a curtain such as curtain 426 in a vehicle. While this attachment method may be used, it is not required, and thus the tabs 432 may extend beyond the mounting panel 440 and be attached directly to the vehicle using additional fasteners 38.

The bracket 410 is illustrated to encompass an inflatable curtain airbag cushion 426. The inflatable curtain 426 is here illustrated in a stowed configuration for storage within the bracket 410, during normal operation of the vehicle. The curtain 426 includes tabs 432 which extend through curtain pivots 474 to be attached to a portion of the vehicle such as the roof rails 14. In addition, the curtain 426 includes a fill channel 428 near the top of the folded curtain and a cushion body 430 to be positioned near a vehicle occupant. The curtain 426 has an outboard face 434 which deploys facing the side walls and doors of the vehicle and an inboard face 436 which deploys facing the vehicle occupant. In the configuration illustrated in FIG. 8, the curtain 426 is roll-folded such that when deployed, the curtain 426 drops downwardly into the passenger cabin of the vehicle and unrolls downward as it inflates. In the specific configuration of FIG. 8, the curtain 426 is roll-folded such that is oriented toward the vehicle occupant. One of ordinary skill in the art understands alternate folding methods for inflatable curtain airbag cushions such as 426. One example is roll-folding the cushion 426 toward the outboard face 434 of the curtain 426 such that during deployment it unrolls toward the outer wall of the vehicle.

When the curtain 426 of FIG. 8 is first deployed, the fill channel 428 receives inflation gas or fluid first, and expands to push the roll-folded cushion body 430 out of the bracket 410. As the fill channel 428 expands, it contacts the interior surfaces of the top and inboard reaction panels 450, 470, which serve as reaction surfaces by supplying a reaction force to the cushion 426, directing it in an outboard orientation in a lateral direction 92a and downward in a transverse direction 90.

Figure 9:
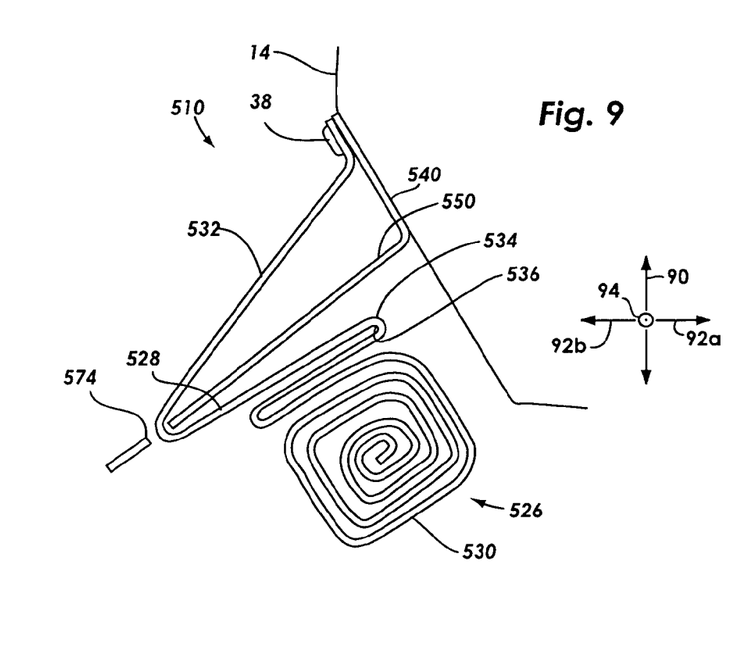
FIG. 9 is a cross-sectional view of another inflatable curtain trajectory bracket according to the invention taken in a position similar to that of FIGS. 3A–8.

Referring next to FIG. 9, a cross-sectional view of another inflatable curtain trajectory bracket 510 according to the invention is shown taken in a position similar to that of FIGS. 3A–8. In this Figure, the bracket 510 includes only an outboard bracket mounting panel 540 and top reaction panel 550. The top panel 550 includes a curtain pivot 574 through which the tabs 532 extend to be attached to the vehicle. As in FIG. 8, the tabs 532 may be attached to the vehicle directly, or instead, be attached to the mounting panel 540. Also as above, the tabs 532 may be attached using fasteners 38 used to attach the bracket 510 to the vehicle roof rail 14, or using separate brackets. Alternatively, the tabs 532 may instead be attached directly to the vehicle.

As in previously-discussed Figures, the airbag cushion 526 has tabs 532, a curtain fill channel 528, and a curtain body 530. The curtain 526 includes an outboard face 534 that deploys such that it faces the side walls and doors of the vehicle. The curtain 526 also includes an inboard face 536 that deploys such that it faces a vehicle occupant. As illustrated, the cushion 526 is shown folded in a stowed configuration. Portions of the fill channel 528 are shown pleat-folded, while the curtain body 530 is shown roll-folded with an orientation toward the occupant face 536 of the curtain 526. As with previously-discussed curtain brackets of the invention, the bracket 510 may be used to modulate the trajectory of the deploying airbag curtain 526. As above, the more distal the curtain pivots 574 are positioned to the roof rail 14 of the vehicle the greater the curtain 526 is rotated in an outward lateral direction 92a.

Figure 10:
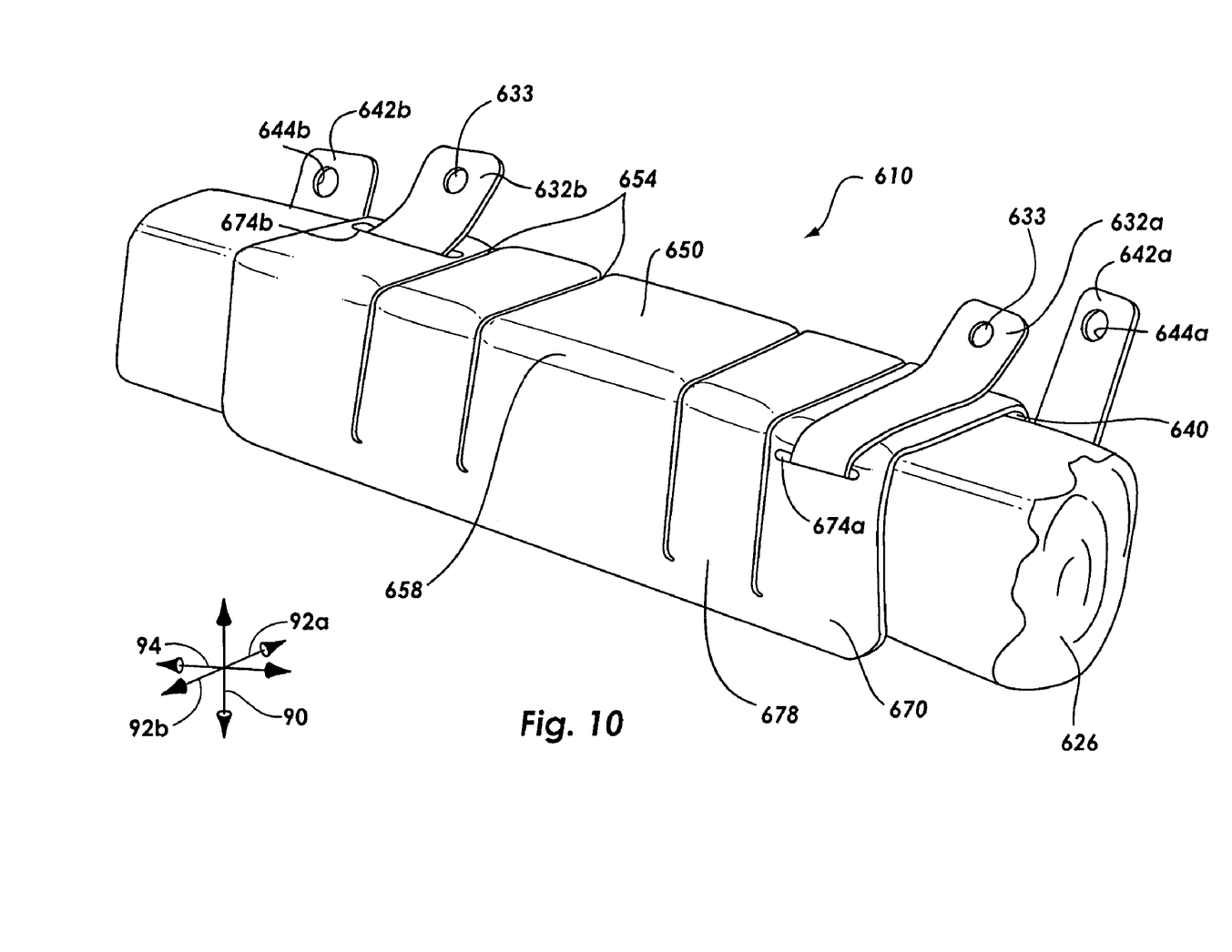
FIG. 10 is an isolated perspective view of another inflatable curtain trajectory bracket according to the invention showing the bracket isolated from the vehicle with the inflatable curtain in its stowed configuration.

FIG. 10 is an isolated perspective view of another inflatable curtain trajectory bracket 610 according to the invention. This bracket 610, shown isolated from the vehicle and enclosing a stowed inflatable curtain 626, illustrates a configuration in which it is desirable to rotate the airbag cushion 626 differentially along the length of the bracket 610. As with previously discussed brackets, bracket 610 includes a mounting panel 640, a top bracket reaction panel 650, and an inboard panel 670 which are combined to enclose the curtain 626. The top panel 650 has a bend 658, and the inboard panel 670 has a bend 678. The bracket 610 may further include mounting tabs 642a, 642b with bores 644a, 644b. As with previously-described brackets, bracket 610 may optionally include ribs 654 for stability. The curtain 626 includes tabs 632a, 632b with openings 633. The tabs 632a, 632b project through curtain pivots 674a, 674b to be attached to the vehicle.

In the bracket 610, the curtain pivots 674a, 674b are placed asymmetrically on the bracket 610. As described above in detail, the positioning of the curtain pivots 674a, 674b serves to modulate the rotation of the curtain 626 during deployment. With reference to curtain pivot 674a, since the tab 632a projects through the bracket 610 through pivot 674a positioned on the inboard panel 670 of the bracket 610, a portion of the cushion contiguous to tab 632a is directed to deploy in an outboard lateral direction 92a. This is at least in part due to the placement of the pivot 674a distally to the mounting bracket 640. Thus, portions of the curtain 626 near tab 632a will be rotated laterally in an outboard direction 92a. As explained above, this is caused at least in part by the curtain being angled to react against the top panel 650 and the inboard panel 670 during deployment, thus directing inflation outward in a lateral direction 92a.

In contrast, curtain pivot 674b is positioned near the mounting panel 640, where the bracket 610 is mounted to a vehicle. As discussed previously, placement of the curtain pivot 674b near the mounting panel 640 of the bracket 610 results in deployment of the curtain 626 downwardly in a transverse direction 90, and inwardly in a lateral direction 92b. This deployment characteristic may be caused at least in part by the curtain 626 being angled to react against the top panel 650 and the mounting panel 640 during deployment. Such a deployment characteristic may be useful to aid a curtain 626 in deploying around an obstacle such as a vehicular pillar or trim structure. One of ordinary skill in the art would understand that within the scope of the invention, the position of both pivots 674a, 674b may be varied to tune the deployment trajectory of the curtain 626. In addition, the bracket 610 may be elongated and additional pivots analogous to 674a and 674b may be added to regulate the deployment of the curtain as needed.

Figure 11:
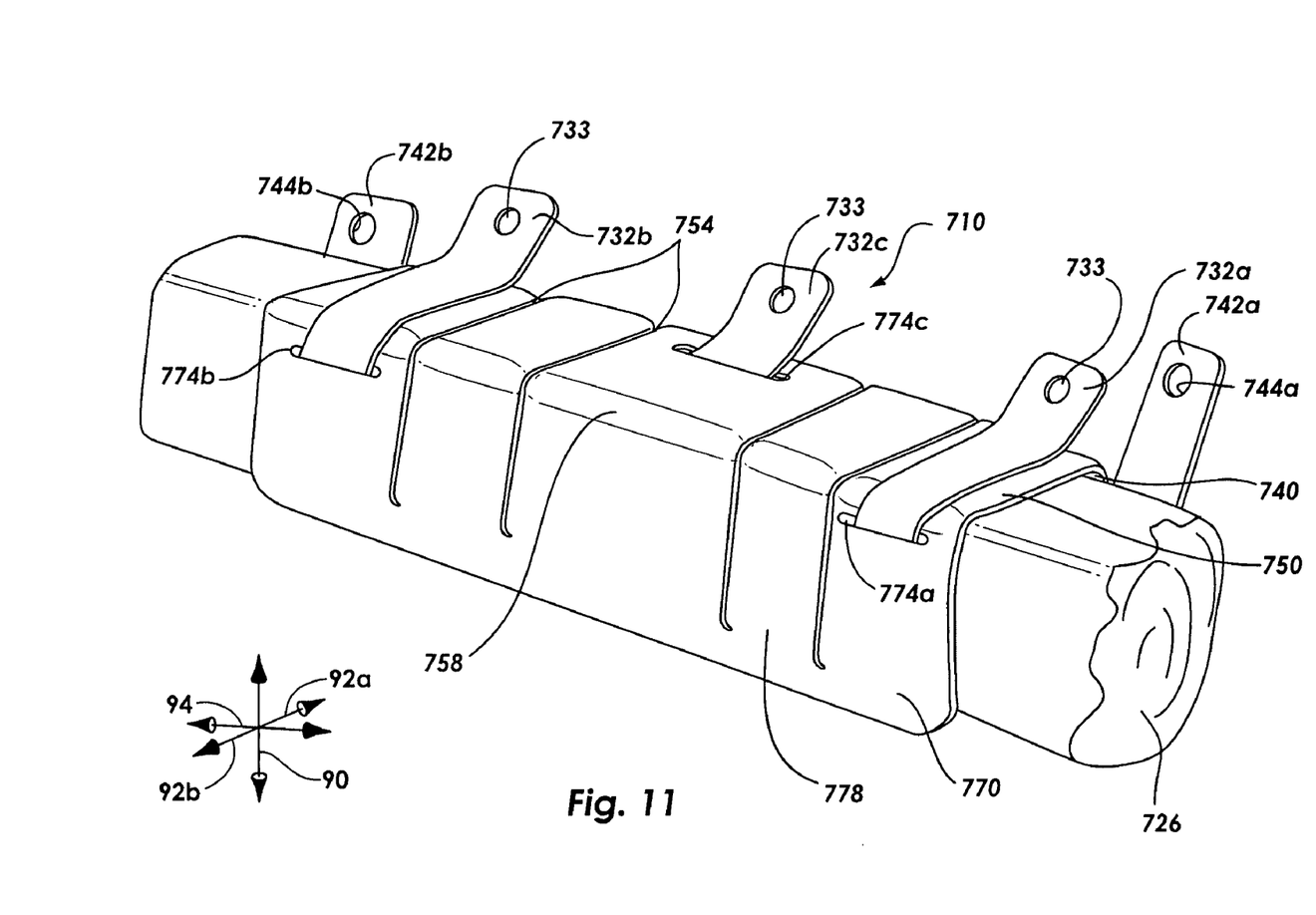
FIG. 11 is an isolated perspective view of yet another inflatable curtain trajectory bracket according to the invention showing the bracket isolated from the vehicle with the inflatable curtain in its stowed configuration.

Referring next to FIG. 11, an isolated perspective view of an inflatable curtain trajectory bracket 710 according to the invention is shown in which the bracket 710 is isolated from a vehicle and in which an inflatable curtain 726 is illustrated in its stowed configuration. The bracket 710 is similar in construction to the bracket illustrated in FIG. 10, having a mounting panel 740, a top panel 750, and an inboard panel 770. The inboard panel 770 is illustrated to include bends 758 and 778. As in the bracket 610 of FIG. 10, the bracket 710 of FIG. 11 includes multiple pivots, here pivots 774a, 774b, and 774c which are placed at different points along the length of the bracket 710. The bracket 710 may further include mounting tabs 742a, 742b with bores 744a, 744b. As with previously-described brackets, bracket 710 may optionally include ribs 754 for stability. The curtain 726 includes tabs 732a, 732b, 732c with openings 633. The tabs 632a, 632b project through curtain pivots 674a, 674b to be attached to the vehicle.

In the bracket 710 of FIG. 11, brackets 774a and 774b are placed on the inboard panel 770 to direct the deployment of the curtain 726 in an outboard lateral direction 92a. A third pivot 774c is placed between pivots 774a and 774b to redirect the curtain in that area inwardly in a lateral direction 92b. Such a configuration may be useful to deploy the curtain away from occupants in the regions of the cushion 726 coordinated with tabs 732a, 732b and pivots 774a, 774b while simultaneously deploying the cushion 726 away from a vehicular pillar or like obstruction.

Figure 12:
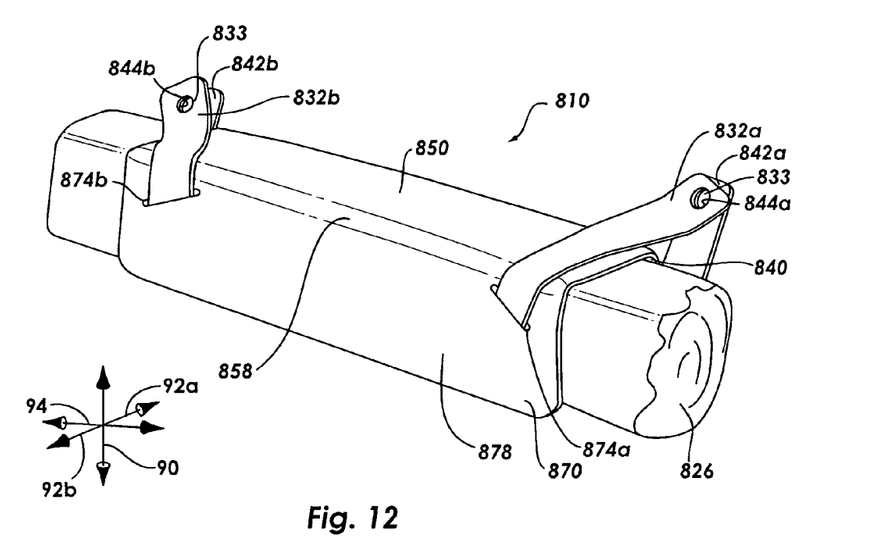
FIG. 12 is an isolated perspective view of another inflatable curtain trajectory bracket according to the invention showing the bracket isolated, but including an inflatable curtain in its stowed configuration.

FIG. 12 is an isolated perspective view of another inflatable curtain trajectory bracket 810 according to the invention. The bracket 810 is isolated, but shown with a curtain 826 stowed in a space defined by the mounting panel 840, top panel 850, and inboard panel 870. As in previous brackets, the bracket 810 may include bends 858, 878, and mounting tabs 842a, 842b with bores 844a, 844b. Bracket 810 is illustrated without structural ribs shown in other embodiments since such ribs are optional for the practice of the invention. In this Figure, the curtain 826 includes curtain tabs 832a, 832b extending from the roll-folded curtain 826 through curtain pivots 874a, 874b. In bracket 810, the curtain pivots 874a, 874b are angled. This may allow the curtain tabs 832a, 832b to approach the bracket mounting tabs 842a, 842b and potentially to allow the bores 844a, 844b of the mounting tabs 842a, 842b to share fasteners with orifices 833 of the curtain tabs 832a, 832b. This may promote efficiency in assembly and/or installation of the bracket 810. Here, pivots 874a, 874b are angled in opposite directions, outwardly. It should be noted that the pivots 874a, 874b may be angled independently or together in a wide variety of configurations within the scope of the invention.

Figure 13:
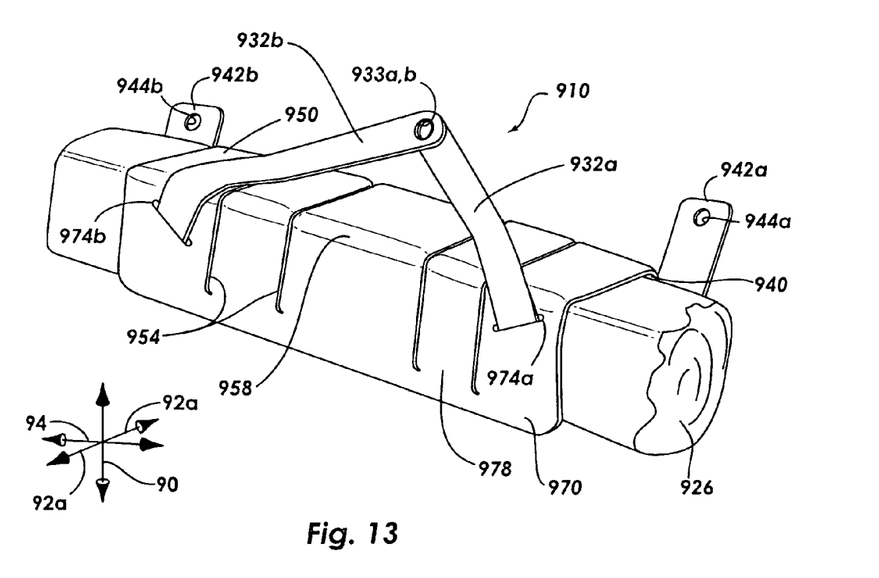
FIG. 13 is an isolated perspective view of still another inflatable curtain trajectory bracket according to the invention showing the bracket isolated with an inflatable curtain installed therein in its stowed configuration.

Referring next to FIG. 13, an isolated perspective view of still another inflatable curtain trajectory bracket 910 according to the invention showing the bracket 910 isolated with an inflatable curtain 926 installed therein in its stowed configuration. This bracket 910 is similar to that illustrated in FIG. 12 in structure, including a mounting panel 940, top panel 950, and inboard panel 970. The bracket 910 is shown to include bends 958, 978, and mounting tabs 942a, 942b with bores 944a, 944b. The bracket 910 is illustrated to include structural ribs 954 shown in other embodiments of the brackets of the invention. The curtain 926 includes curtain tabs 932a, 932b extending from the roll-folded curtain 926. As in the bracket 810 of FIG. 12, the bracket 910 includes curtain pivots 974a, 974b that are angled. In FIG. 13, the pivots 974a, 974b are angled inwardly. This allows the curtain tabs 932a, 932b to be drawn smoothly together about the bracket 910 and have their orifices 933a, 933b to be aligned, allowing multiple tabs 932a, 932b to be mounted to the vehicle using a single attachment (not shown). This may promote efficiency in assembly and/or installation of the bracket 910. It should again be noted that the pivots 974a, 974b may be angled independently or together in a wide variety of configurations within the scope of the invention.

Thus, the present invention provides brackets for controlling the inflation trajectory of at least a portion of an inflatable curtain airbag cushion. Such brackets generally include a bracket mounting panel configured to abut a roof rail of a vehicle and to be secured to the vehicle. In addition, the brackets additionally include a curtain reaction panel extending from the bracket mounting panel into the cabin of the vehicle. The brackets may additionally include an inboard reaction panel to allow more complete encompassing of an airbag cushion by the bracket of the invention. The brackets of the invention are sized to correspond to a portion of an inflatable curtain airbag cushion that is desired to be rotated either inwardly or outwardly during deployment of the cushion.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A bracket for controlling the inflation trajectory of at least a portion of an inflatable curtain airbag cushion comprising:
a bracket mounting panel for securing the bracket to a vehicle;
a curtain reaction panel sized to correspond to the length of at least a portion of the inflatable curtain, the reaction panel extending from the bracket mounting panel in an inboard direction at an angle and terminating in an inboard edge; and
a curtain pivot positioned on the bracket for rotating the deploying inflatable curtain; wherein the bracket directs the inflation of at least a portion of the inflatable curtain in a direction selected by the positioning of the curtain pivot relative to the mounting panel, wherein the curtain pivot is a slot for receiving a portion of the inflatable curtain, the slot being positioned on the curtain reaction panel.

2. The bracket of claim 1, wherein the bracket mounting panel further comprises a mounting tab.

3. The bracket of claim 1, wherein the curtain reaction panel is sized to correspond to a feature selected from the group consisting of a vehicle pillar, an occupant region, and a trim panel.

4. The bracket of claim 1, wherein the curtain reaction panel extends from the bracket mounting panel at a substantially perpendicular angle.

5. The bracket of claim 1 wherein the curtain pivot is positioned adjacent the inboard edge of the curtain reaction panel.

6. The bracket of claim 1, wherein the curtain pivot is the inboard edge of the curtain reaction panel.

7. The bracket of claim 1, including at least two curtain pivots.

8. The bracket of claim 7, wherein the curtain pivots are positioned differentially relative to the mounting panel.

9. The bracket of claim 8, wherein at least one of the curtain pivots is the inboard edge of the curtain reaction panel.

10. The bracket of claim 1, wherein the curtain pivot is angled.

11. The bracket of claim 1, wherein the bracket further comprises an inboard reaction panel extending from the inboard edge of the curtain reaction panel at an angle substantially perpendicular to the curtain reaction panel such that when mounted in a vehicle, the inboard reaction panel is angled downwardly and outwardly.

12. The bracket of claim 11, wherein the curtain pivot is positioned on the inboard reaction panel.

13. The bracket of claim 12, wherein the curtain pivot is a slot for receiving a portion of the inflatable curtain.

14. The bracket of claim 13, wherein the curtain pivot is positioned adjacent the inboard edge of the curtain reaction panel.

15. The bracket of claim 11, including at least two curtain pivots.

16. The bracket of claim 15, wherein the curtain pivots are positioned on the curtain reaction panel or the inboard panel.

17. The bracket of claim 15, wherein curtain pivots are positioned both on the curtain reaction panel and the inboard panel.

18. The bracket of claim 1, further comprising ribs in at least one of the panels of the bracket.

19. An inflatable curtain airbag module comprising:
an inflatable curtain airbag cushion;
a bracket for controlling the inflation trajectory of at least a portion of the inflatable curtain airbag cushion, the bracket including a mounting panel for securing the bracket to a vehicle, a curtain reaction panel sized to correspond to the length of at least a portion of the inflatable curtain, and a curtain pivot positioned on the curtain reaction panel; wherein the reaction panel extends from the mounting panel at an angle and terminates in an inboard edge, further comprising ribs in at least one of the panels of the bracket.

20. The inflatable curtain airbag module of claim 19, wherein the mounting panel of the bracket further comprises a mounting tab.

21. The inflatable curtain airbag module of claim 19, wherein the curtain reaction panel is sized to correspond to a feature selected from the group consisting of a vehicle pillar, an occupant region, and a trim panel.

22. The inflatable curtain airbag module of claim 19, wherein the curtain reaction panel extends from the bracket mounting panel at a substantially perpendicular angle.

23. The inflatable curtain airbag module of claim 19, wherein the curtain pivot is a slot for receiving a portion of the inflatable curtain, the slot being positioned adjacent the inboard edge of the curtain reaction panel.

24. The inflatable curtain airbag module of claim 19, wherein the curtain pivot is the inboard edge of the curtain reaction panel.

25. The bracket of claim 19, including at least two curtain pivots.

26. The bracket of claim 25, wherein the curtain pivots are positioned differentially relative to the mounting panel.

27. The bracket of claim 26, wherein at least one of the curtain pivots is the inboard edge of the curtain reaction panel.

28. The bracket of claim 19, wherein the curtain pivot is angled.

29. The inflatable curtain airbag module of claim 19, wherein the bracket further comprises an inboard reaction panel extending from the inboard edge of the curtain reaction panel at an angle substantially perpendicular to the curtain reaction panel such that when mounted in a vehicle, the inboard reaction panel is angled downwardly and outwardly.

30. The inflatable curtain airbag module of claim 29, wherein the bracket includes at least one curtain pivot positioned on the inboard reaction panel.

31. The inflatable curtain airbag module of claim 30, wherein the curtain pivot is a slot for receiving a portion of the inflatable curtain.

32. The inflatable curtain airbag module of claim 31, wherein the curtain pivot is positioned adjacent the inboard edge of the curtain reaction panel.

33. The inflatable curtain airbag module of claim 19, wherein the inflatable curtain airbag cushion is roll-folded.

34. The inflatable curtain airbag module of claim 19, wherein the inflatable curtain airbag cushion is pleat-folded.

35. The inflatable curtain airbag module of claim 34, wherein the pleat-folded inflatable curtain airbag cushion is placed in the module at an angle to a desired direction of curtain deployment.

36. A bracket for controlling the inflation trajectory of at least a portion of an inflatable curtain airbag cushion comprising:
   a bracket mounting panel having a mounting tab for securing the bracket to a vehicle;
   a curtain reaction panel sized to correspond to the length of at least a portion of the inflatable curtain, the reaction panel extending from the bracket mounting panel in an inboard direction at an angle and terminating in an inboard edge;
   a first curtain pivot positioned on the bracket for rotating the deploying inflatable curtain airbag cushion; and
   a second curtain pivot positioned on the bracket for rotating the deploying inflatable curtain airbag cushion; wherein the bracket directs the inflation of at least a portion of the inflatable curtain airbag cushion in a direction selected by the positioning of the curtain pivot relative to the mounting panel, and wherein the first curtain pivot and the second curtain pivot are positioned differentially relative to the mounting panel.

37. A bracket for controlling the inflation directory of at least a portion of an inflatable curtain airbag cushion comprising:
   a bracket mounting panel having a mounting tab for securing the bracket to a vehicle;
   a curtain reaction panel sized to correspond to the length of at least a portion of the inflatable curtain, the reaction panel extending from the bracket mounting panel in an inboard direction at an angle and terminating in an inboard edge;
   an inboard reaction panel extending from the inboard edge of the curtain reaction panel at an angle substantially perpendicular to the curtain reaction panel; and
   a curtain pivot positioned on the inboard edge of the curtain reaction panel for rotating the deploying inflatable curtain airbag cushion; wherein the bracket directs the inflation of at least a portion of the inflatable curtain airbag cushion in a direction selected by the positioning of the curtain pivot relative to the mounting panel, wherein the curtain pivot is a slot for receiving a portion of the inflatable curtain, the slot being positioned on the curtain reaction panel.

* * * * *